(12) United States Patent
Morales et al.

(10) Patent No.: US 11,893,286 B1
(45) Date of Patent: Feb. 6, 2024

(54) PRINTING SYSTEM AND METHODS FOR MANAGING COLOR PRINTING RESOURCES

(71) Applicant: Kyocera Document Solutions Inc., Osaka (JP)

(72) Inventors: Javier A. Morales, Rochester, NY (US); Katherine Bayquen Lao, Pacheco, CA (US); Paul Michael Ong Siy, Walnut Creek, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/880,129

(22) Filed: Aug. 3, 2022

(51) Int. Cl.
*G06F 3/12* (2006.01)

(52) U.S. Cl.
CPC .......... *G06F 3/1208* (2013.01); *G06F 3/1255* (2013.01); *G06F 3/1257* (2013.01)

(58) Field of Classification Search
None
See application file for complete search history.

(56) References Cited

U.S. PATENT DOCUMENTS

| 2006/0119874 A1* | 6/2006 | Kurihara | H04N 1/6097 358/1.13 |
| 2016/0275383 A1* | 9/2016 | Yukie | G06K 15/1803 |
| 2017/0208217 A1* | 7/2017 | Soriano | H04N 1/00061 |

\* cited by examiner

*Primary Examiner* — Lennin R Rodriguezgonzalez
(74) *Attorney, Agent, or Firm* — Millen, White, Zelano & Branigan P.C.; William F. Nixon (57) ABSTRACT

A printing system uses different color quality values to set quality levels for color printing operations. When creating a calibration for a paper, a color quality attribute is defined that corresponds with the level of color printing quality for the calibration. The resulting calibration is stored with the color quality attribute. The calibration is used to create an ICC profile that is used in color printing operations for the paper. Print jobs may indicate the color quality attribute for the paper for color printing such that the calibration and ICC profile are selected.

14 Claims, 7 Drawing Sheets

PRINTING SYSTEM AND METHODS FOR MANAGING COLOR PRINTING RESOURCES

FIELD OF THE INVENTION

The present invention relates to a printing system and associated methods to manage color printing resources at a printing device. More particularly, the present invention relates to simplifying the management of color printing resources through use of a color quality attribute.

DESCRIPTION OF THE RELATED ART

Color management is one of the more complex aspects of production printing operations. In order to properly use color management, a printing device is calibrated in order to ensure a stable and predictable foundation on top of which to manage color reproduction. The operator may calibrate one or more papers of paper groups. The operator also may perform multiple calibrations for the same paper or paper group. In addition to calibration, the operator may create one or more ICC profiles for each calibration. Thus, multiple calibrations and ICC profiles may be implemented by a printing device for the various papers available thereon. In order to properly use color management, the operator must select the correct resources for the desired paper. In addition, the operator must select the resources that are created using the desired color management settings. Overall, this process makes selection of the proper color management settings a challenge for non-expert operators.

SUMMARY OF THE INVENTION

A method for managing color printing resources for printing operations is disclosed. The method includes selecting a color quality attribute for a paper for use in the printing operations at a printing device. The method also includes performing a calibration for the paper. Settings for the calibration correspond to the color quality attribute. The method also includes storing the calibration for the paper with the color quality attribute. The method also includes generating an ICC profile based on the calibration. The ICC profile is associated with the settings for the calibration and the color quality attribute. The method also includes receiving a print job using the paper. The print job specifies the color quality attribute. The method also includes applying the ICC profile to color printing the print job using the paper.

A method for managing color printing resources for printing operations is disclosed. The method includes selecting a first color quality attribute for a paper for use in printing operations. The method also includes performing a first calibration for the paper. A first set of settings for the first calibration correspond to the first color quality attribute. The method also includes storing the first calibration for the paper with the first color quality attribute in a paper catalog. The method also includes selecting a second color quality attribute for the paper. The method also includes performing a second calibration for the paper. A second set of settings for the second calibration correspond to the second color quality attribute. The second set of settings differ from the first set of settings. The method also includes storing the second calibration for the paper with the second color quality attribute in the paper catalog. The method also includes receiving a print using the paper. The print job specifies one of the first color quality attribute or the second color quality attribute.

A method for color printing a document at a printing device is disclosed. The method includes generating a print job using a media to be printed at the printing device. The print job specifies a paper attribute. The method also includes determining whether the paper attribute matches a paper catalog entry. The method also includes displaying at least one color quality attribute for the paper catalog entry. The method also includes selecting a color quality attribute from the at least one color quality attribute. The method also includes printing the print job using a paper associated with the color quality attribute at the printing device.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

Figure 1A:
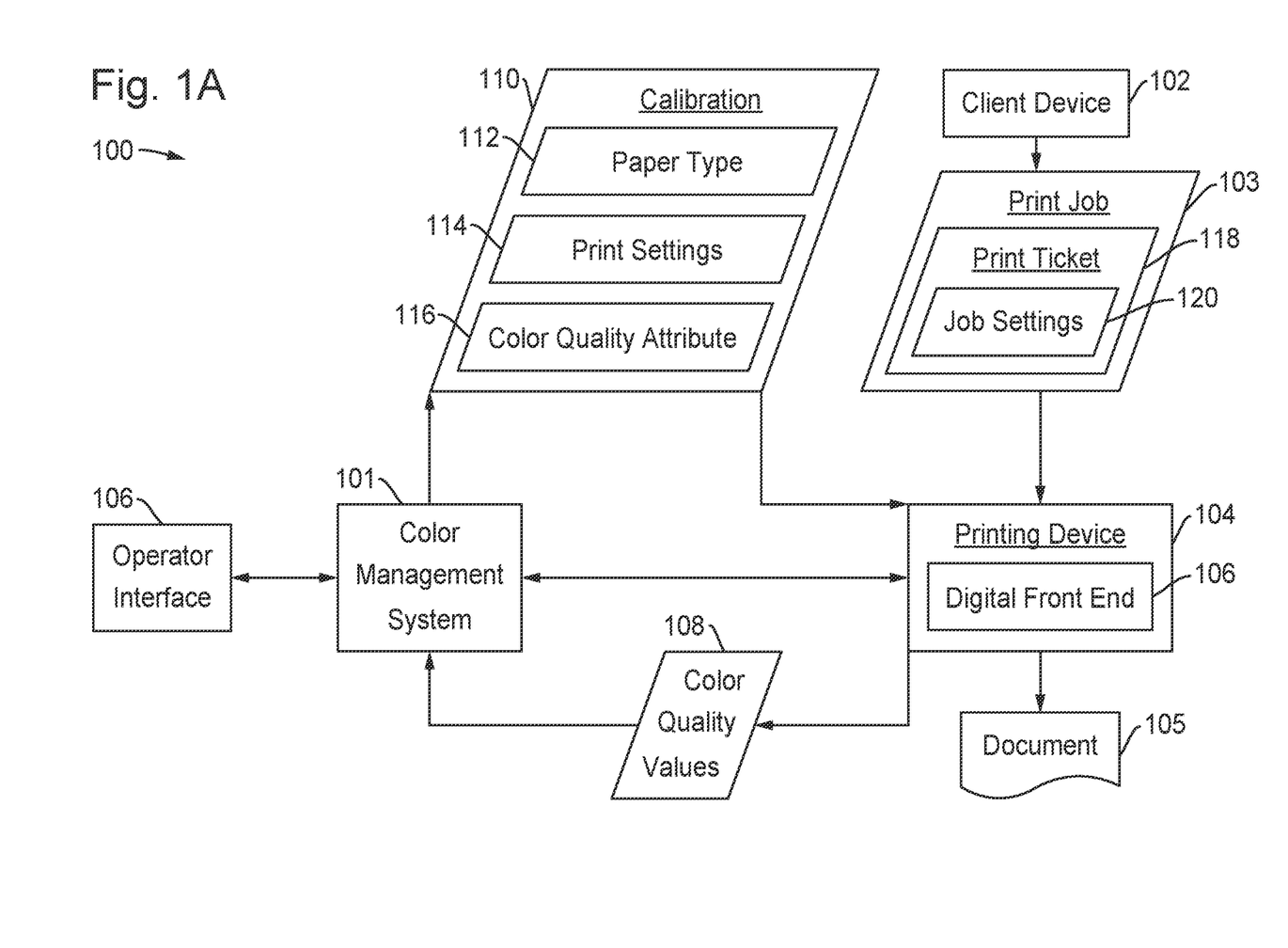
FIG. 1A illustrates a printing system for printing documents according to the disclosed embodiments.

The disclosed embodiments implements enhancements to the typical color management workflow in order to simplify use of color management by operators. FIG. 1A depicts a printing system 100 for printing documents using printing device 104 according to the disclosed embodiments. Printing system 100 may be located in a print shop or other environment suitable for production printing operations. Printing system 100 includes one or more printing devices 104 that receive print jobs from one or more client devices 102.

The printing system may use a color management system 101 to add a color quality attribute to the calibration resources that will be used by users to select all color management settings. When the operator starts a calibration, color management system 101 will query printing device 104 for all color quality values 108 and present those to the operator via operator interface 106. If printing system 100 includes multiple printing devices, then color management system 101 may query all printing devices and return an aggregated list of all color quality values 108.

Color quality values 108 may be proxies for all color management settings at printing device 104. For example, color quality values 108 may corresponds to color management settings such as premium, standard, business, and economy. The operator will select settings to match the level of quality that is assumed with a specific label for the color quality. Using color quality values 108, the operator selects an existing value, creates a new value, or leaves the color quality value undefined.

Color management system 101 generates calibration 110 to be performed at printing device 104. Calibration at printing device 104 ensures that, for example, nozzles and paper are properly aligned and printing according to the desired standards. Calibration 110, in addition to the materials and data needed to perform the calibration, includes paper type 112 used for the calibration, print settings 114, and color quality attribute 116. Color quality attribute 116 will correspond to the color quality level specified by the operator. In some embodiments, the operator may create multiple calibrations 110 with different print settings 114 and color quality attributes 116.

Printing device 104 receives print jobs through printing system 100, such as print job 103. After processing print job 103, printing device 104 prints or produces document 105 in a paper or media specified by the print job. Printing device 104 is disclosed in greater detail in FIG. 2. Printing device 104 also includes digital front end (DFE) 106, which facilitates processing print job 103. DFE 106 may be disclosed in greater detail in FIG. 1B.

Figure 1B:
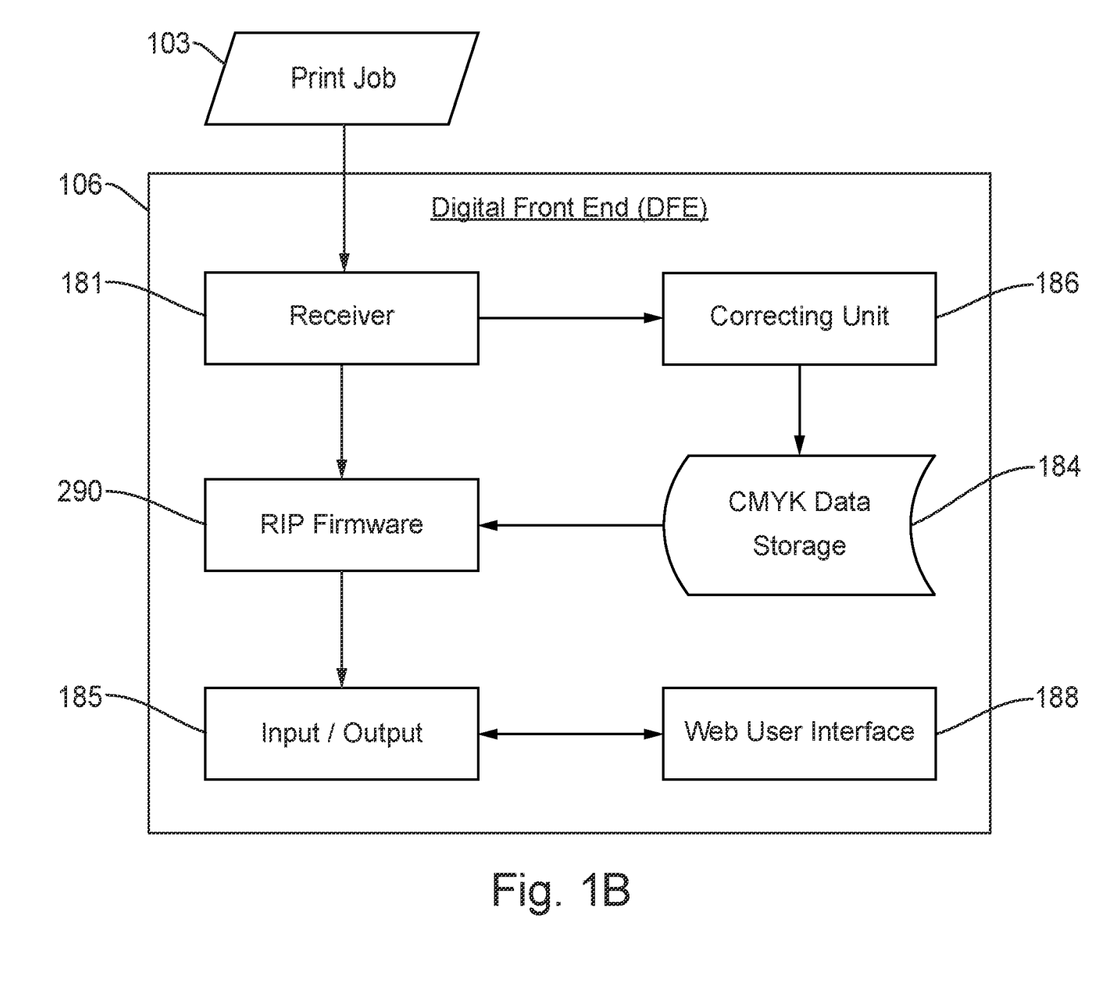
FIG. 1B illustrates a digital front end (DFE) for a printing device according to the disclosed embodiments.

DFE 106 may use RIP firmware 290, shown in FIG. 1B, to convert bitmap images, vector graphics, fonts, and the like associated with pages in print job 103 to bitmap/rasterized representations of the pages, such as C, M, Y, and K pixels. The sum of the values of pixels of a particular color in the rasterized pages can be proportional to the amount of consumables used by printing device 104 to print that color. RIP firmware 290 may rasterize pages of print job 103 according to various image rasterization settings. For example, these image rasterization parameters may include calibration curves, paper definitions, ICC profiles, spot color definitions, TRCs, color conversion settings, colorant limits for ink or toner, rendering intent, K preservation, CGR level, max colorant densities, print margins, halftones, and the like.

Figure 2:
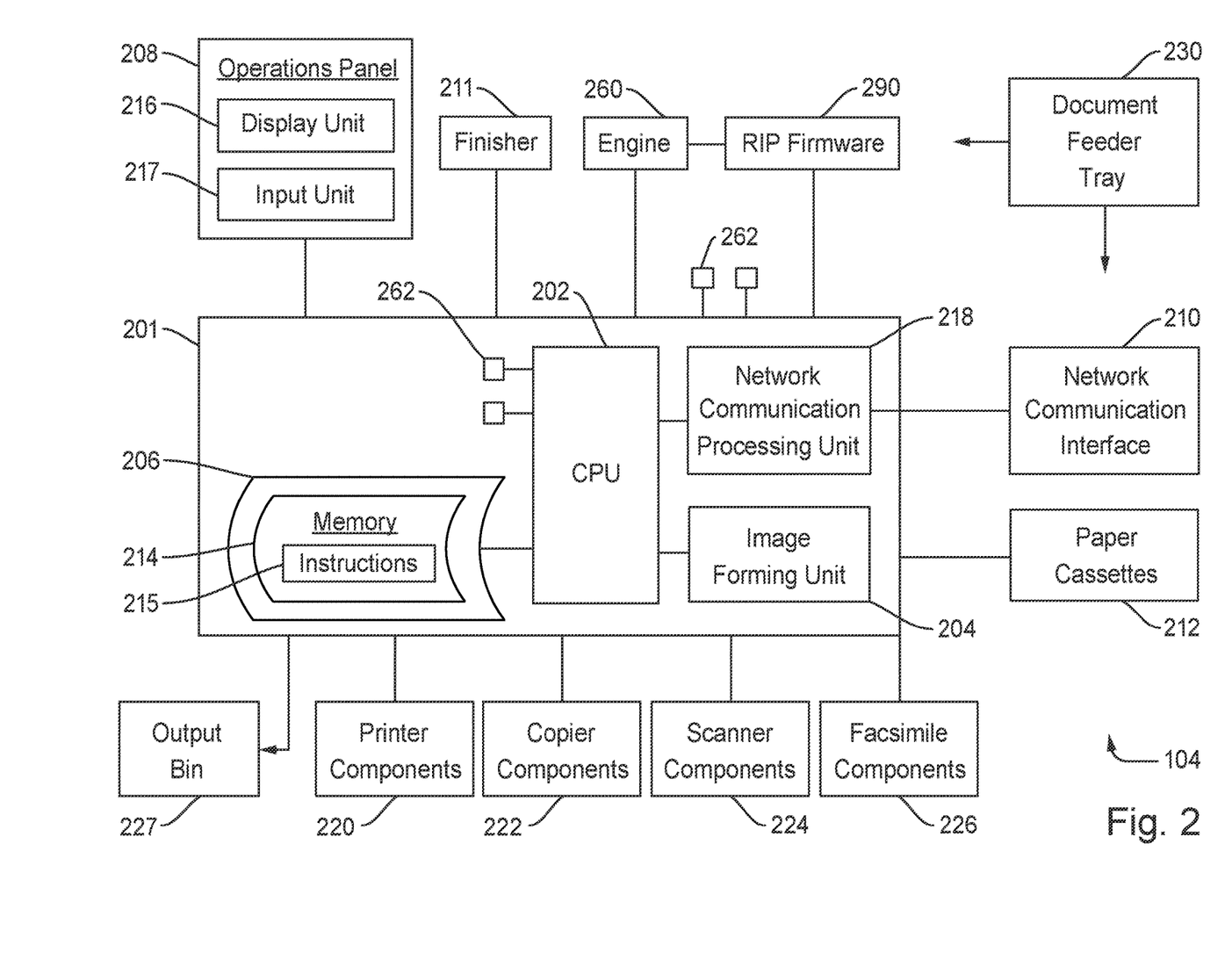
FIG. 2 illustrates a block diagram of components of the printing device for use within the printing system according to the disclosed embodiments.

Print engine 260, shown in FIG. 2, also is included within printing device 104. Printing device 104 may correspond to an industrial printing device capable of printing thousands of pages in an hour. Printing device 104 may be ink-based, toner-based, or both. Print engine 260 may include various parameters, known as printing device configuration settings, which can control the operation of printing device 104, and impacts the amount of consumables required by the printing device. For example, these settings may include printing device maintenance settings that control or effect head cleaning intervals, head clogging prevention intervals, and the like of printing device 104. Printing device configuration settings also may include spitting, or printing spray pattern over all content, the printing of purge sheets, the printing of spit lines, or lines printed between page frames in a roll-fed printing device to ensure that all jets of the print head fire when instructed.

As noted above, print job 103 may be created at client device 102. Print job 103 includes a print ticket 118. Print ticket 118 includes one or more job settings 120. Job settings 120 may relate to a property of print job 103, such as the number of sheets to be printed or whether print job 103 includes a cover. Job settings 120 include parameters for print job 103, such as the type of media or paper used, texture, hole type, finishing instructions, and the like. Jobs settings 120 each may have attributes associated therewith. For example, an attribute for a type of paper may be the weight of the paper. For a cover, an attribute may be the cover weight.

FIG. 1B depicts a block diagram of DFE 106 according to the disclosed embodiments. DFE 106 includes a receiver 181, an RIP firmware 290, a CMYK data storage 184, an input/output connector 185, and a correcting unit 186. RIP firmware 290 also is disclosed in FIG. 2 and in greater detail in FIG. 3. Additional components within DFE 106 may be implemented, including those disclosed in FIG. 1A.

Receiver 181 receives print job 103 received within system 100 and outputs the print job to RIP firmware 290. Receiver 181 also may receive color information for the document or documents within the print job. It may output the color information to correcting unit 186. The print job received by receiver 181 is associated with image data to be printed on print media. It also may include print condition information including information for indicating single-sided printing or two-sided printing or print medium-type information along with other data associated with the print job.

RIP firmware 290 converts image data associated with the print job into raster data to thereby generate rendering data, and outputs the generated rendering data. RIP firmware 290 also converts the rendering data into rendering data in a CMYK format. When the rendering data is originally in the CMYK format, or CMYK rendering data, the conversion may not be performed. RIP firmware 290 may perform gradation conversion of the CMYK rendering data, with reference to one or more tone reproduction curves (TRCs). A TRC refers to data indicating the relationship between a colored gradation value for rendering data and print color, or print density, on a given print medium.

When print color provided by printing device 104 alters over time, the TRCs stored in CMYK data storage 184 may be each deviated from an actually measured relationship between a colored value and print color. When the TRC is shifted from the actual relationship, gradation conversion for each colored gradation value cannot match a desired print color. In this regard, correcting unit 186 corrects the deviation, from the actual relationship, of the TRC stored in CMYK data storage 184 in order to allow each colored gradation value to match a desired print color. Correcting unit 186 converts RGB color information obtained through receiver 181 into CMYK color information. Correcting unit 186 may use the converted CMYK color information to generate the TRC. The TRC stored in CMYK data storage 184 is replaced with the generated TRC. Correcting unit 186 may correct the TRC. Correcting unit 186 may rewrite a part of the TRC stored in CMYK data storage 184 to thereby correct the TRC.

The rendering data generated by RIP firmware 290 is transmitted within printing device 104 via input/output connector 185. The print condition information and the print medium type, as well as the rendering data, may be transmitted to engine 260 found in printing device 104 disclosed in FIG. 2.

DFE 106 also includes web user interface 188 that may communicate with other printing devices or color management system 101, if it is located at a separate device, using, for example, input/output connector 185. Web user interface 188, or web application, allows a user of the DFEs of other printing devices to interact with content or software running on DFE 106.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within system 100. As disclosed above, printing device 104 may send and receive data from color management system 101, if a separate device, and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at DFE 106. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Display unit 216 also may serve as to display results from color management system 101, if applicable. Color management system 101 may send calibration and paper catalog information to printing device 104 for display. For example, the operator at printing device 104 may send calibration 110 to printing device 104. Printing device 104 displays paper type 112 and any other information.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from estimation system 108 as well as other printing devices within system 100.

Figure 3:
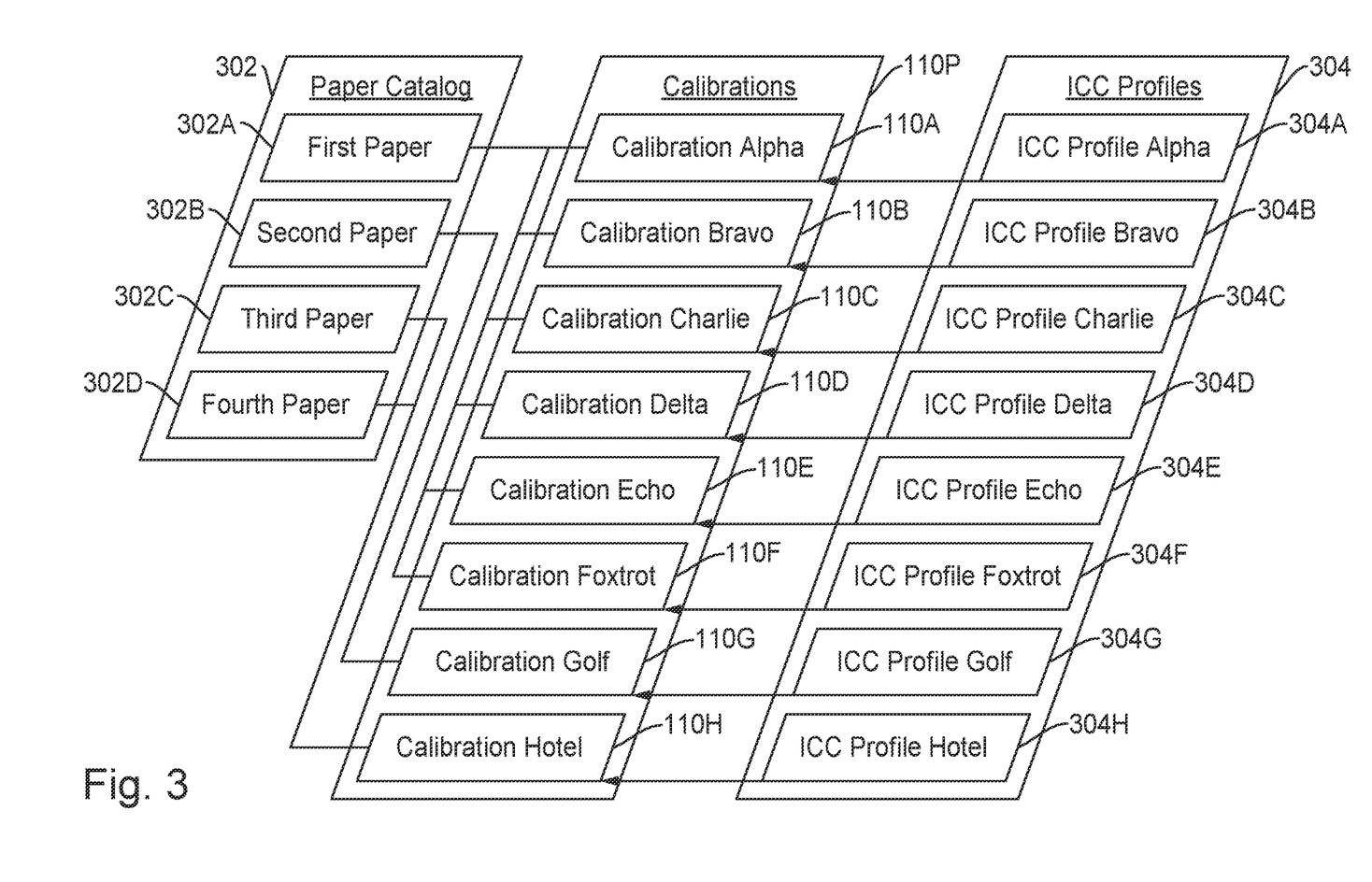
FIG. 3 illustrates a block diagram of a paper catalog with papers corresponding to color management resources applicable to the printing device according to the disclosed embodiments.

FIG. 3 depicts a block diagram of a paper catalog 302 with papers corresponding to color management resources applicable to printing device 104 according to the disclosed embodiments. Paper catalog 302 may include first paper 302A, second paper 302B, third paper 302C, and fourth paper 302D. Additional papers may be within paper catalog 302. Each paper may correspond one or more calibrations 110P and ICC profiles 304. Calibrations 110P are used to denote calibrations already completed at printing device 104 and stored within DFE 106 for use during color printing operations.

For example, first paper 302A may correspond to 6 calibrations and ICC profiles while second paper 302B may correspond to 1 calibration and ICC profile. Third paper 302C and fourth paper 302D may correspond to the same calibration and ICC profile. Thus, management of these resources for color printing may become problematic. It should be noted that each calibration 110 includes print settings 114 and color quality attribute 116 as disclosed in FIG. 1A.

Thus, first paper 302A may correspond to calibration alpha 110A and ICC profile alpha 304A, calibration bravo 110B and ICC profile 304B, calibration charlie 110C and ICC profile charlie 304C, calibration delta 110D and ICC profile delta 304D, calibration echo 110E and ICC profile echo 304E, and calibration foxtrot 110F and ICC profile foxtrot 304F. Second paper 302B corresponds to calibration golf 110G and ICC profile golf 304G. Third paper 302C and fourth paper 302D correspond to calibration hotel 110H and ICC profile hotel 304H.

Each calibration may include its own print, or calibration, settings 114. For example, calibration 110A may include print settings 114 for end point targets (EPTs) and Aims while calibration 110B may include print settings 114 for EPTs, Aims, and print conditions. Calibration 110H may be a plain calibration with basic print settings 114 of resolution and halftones. ICC profiles 304 may include settings as well, such as ink limits, gray component replacement (GCR), and source.

As shown in FIG. 3, different ICC profiles 304 may be created for different papers in paper catalog 302. When creating ICC profiles 304, the operator may be given the option to select a calibration 110P. The operator cannot select the paper or other settings directly. This feature ensures that the operator does not create ICC profiles using the wrong calibration. The ICC profile is associated with the calibration, which in turn is associated with the calibration and all settings used to create the calibration.

Once calibrations 110P and ICC profiles 304 are generated, operators may use them during printing operations, even if an operator is inexperienced. For simple workflows, the default calibration and ICC profile may be used. For print shops that want to have multiple levels of quality, such as premium, standard, business, and economy, the operator normally selects manually both the correct ICC profile and correct calibration. The operator may make a selection from a list of all printing device calibrations and ICC profiles so that it is easy to make a mistake, especially for the cases where the operation is not selecting media using paper catalog 302.

For example, the operator may mismatch the calibration from calibrations 110P and the ICC profile from ICC profiles 304. For first paper 302A, the operator may select calibration bravo 110B and ICC profile delta 304 D. Selection of an ICC profile that was created using different print, or calibration, settings 114 versus the settings for the selected calibration may result in unexpected output. The operator also may select a calibration or ICC profile that is not correct for the selected paper in paper catalog 302. This problem could be selecting a calibration or ICC profile for the wrong paper catalog entry. For example, the operator may select calibration charlie 110C and ICC profile charlie 304C for third paper 302C.

Alternatively, the operator may select a paper catalog profile that does not have a calibration or ICC profile corresponding thereto. Further, the operator may select a media type calibration or ICC profile for a paper that has been calibrated or profiled as a different media. The operator also may select a calibration or ICC profile that is not correct for the specified job settings 120 for print job 103, such as halftone, ink drop size, resolution, and the like.

The disclosed embodiments eliminates the above issues by allowing the operator to specify settings for calibrations 110P applicable to a paper in paper catalog 302 in all cases. For cases in which the print shop used multiple levels of quality, the operator need to only select a color quality level. This feature enables the same level of usability for the case in which the print shop offers a single level of quality versus the case in which the print shop offers multiple levels of quality. Multiple levels of quality are enabled in a manner that is as simple as using a single level of quality is a feature of the disclosed embodiments.

Even in cases where the color quality setting is used, it is possible for the expert operator in the print shop to define papers in paper catalog 302 incompletely. Specifically, all defined values may not be available for all cases. More specifically, defined values may not be available for all media types, all paper catalog entries, resolutions, halftones, ink drop sizes, and the like.

The disclosed embodiments also adds color quality to the print dialog's dynamic print ticketing and conflict checking functionality. When there is no paper selection, the color quality option will display values associated with the default media type. If the operator selects a paper catalog entry, color management system 101 will find the calibrations associated with the selected paper and display values associated with the selected paper. If the operator has already selected a value that is not available for the selected paper, then color management system 101 will warn the user. If the paper does not have a calibration associated with it, then color management system 101 will determine whether the paper belongs to a paper group and uses the calibrations associated with the paper group. If the paper does not have a calibration associated with it and if the paper does not belong to a paper group, then color management system 101 will determine the paper's media type and use the calibrations associated with the media type.

If the operator specified paper attributes, then color management system 101 will determine whether the attributes match tray attributes, paper catalog entries, or both. If the attributes only match to paper catalog entries, then color management system 101 will find all matching paper catalog entries and display all color quality values associated with the potential paper catalog entries. If the operator selects a color quality value then the paper matching in printing device 104 will be restricted to the papers that use the specified print condition. If the attributes only match to tray paper attributes, then color management system 101 will use values associated with the specified or default media types.

If the operator specifies attributes that may match both the paper catalog and tray attributes, then color management system 101 will use the combination of values that is available for both of the previous scenarios. If the operator only specifies a source tray, then color management system 101 will determine the media type for the source tray and display those values to the operator. In all cases, all of the above also is matched against relevant print ticket settings such as resolution, halftone, ink drop size, and the like.

The disclosed embodiments, as discussed above, ensure that it is not possible for the operator to select an invalid color quality setting based on the selected print ticket settings and on the specified media settings. This feature may be particularly useful for instances in which the seasoned operator does a poor job of configuring the color quality settings for printing device 104. A non-expert operator may select only 1 attribute in addition to the usual print ticket settings in order to get predictable and correct color management settings.

Figure 4:
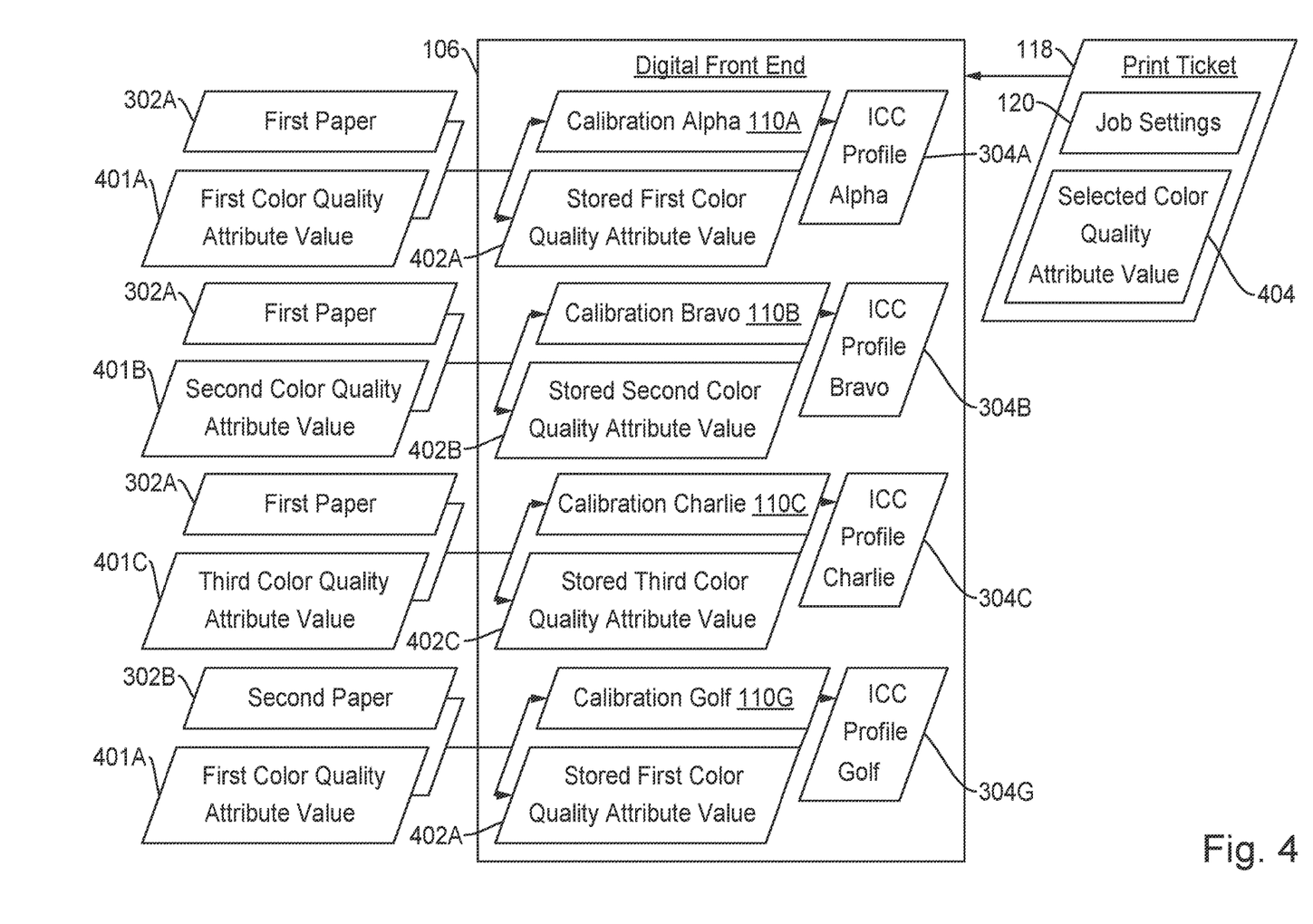
FIG. 4 illustrates a block diagram of color quality attributes being used in color printing operations according to the disclosed embodiments.

FIG. 4 depicts a block diagram of color quality attributes being used in color printing operations according to the disclosed embodiments. As noted above, color quality attribute 116 may be defined when generating calibration 110 by color management system 101. Once the calibration process is performed, completed calibrations 110P are stored at DFE 106.

For example, four calibrations 110P and their associated ICC profiles are shown. Three of the calibrations may relate to first paper 302A in paper catalog 302. One calibration is related to second paper 302B in paper catalog 302. Use of the color quality attribute to track and manage color printing resources also is used.

For example, a calibration, such as calibration 110, is received from color management system 101 to be performed with a color quality attribute 116 for first paper 302A. In FIG. 4, color quality attribute 116 may have a value that corresponds to a level of quality for the printing operations in printing device 104. Thus, different color quality attributes levels having different values may be used. One calibration may specify first paper 302A as paper type 112 and first color quality attribute value 401A for color quality attribute 116. This information is used in generating calibration alpha 110A of completed calibrations 110P. Calibration alpha 110A is stored at printing device 104 along with stored first color quality attribute value 402A, which corresponds to first color quality attribute value 401A. Specifically, first color quality attribute value 401A is the same as stored first color quality attribute value 402A. Stored first color quality attribute value refers to the fact the value is stored with a calibration. ICC profile alpha 304A is created using calibration 110A.

The same process may be repeated for the other calibrations. A second calibration request may include first paper 302A for paper type 112 and second color quality attribute value 401B of color quality attribute 116. The disclosed embodiments generate calibration bravo 110B for first paper 302A and stores stored second color quality attribute value 402B, which corresponds to second color quality attribute value 401B. ICC profile bravo 304B is created using calibration 110B.

A third calibration request may include first paper 302A for paper type 112 and third color quality attribute value 401C for color quality attribute 116. The disclosed embodiments generate calibration charlie 110C for first paper 302A and store stored third color quality attribute value 402C, which corresponds to third color quality attribute value 401C. ICC profile charlie 304C is created using calibration 110C.

Thus, first paper 302A within paper catalog 302 may include multiple calibrations, each one having different color quality attribute values to indicate that the respective color quality level is assigned to the respective calibration. For example, first color quality attribute value 401A may correspond to a premium level of quality, second color quality attribute value 401B may correspond to standard level of quality, third color quality attribute value 401C may correspond to a business level of quality. Though not shown, a fourth color quality attribute would correspond to an economy level of quality.

As a result, calibration alpha 110A may be used for a premium level of color printing for first paper 302A. Calibration bravo 110B may be used for a standard level of color printing for first paper 302A. Calibration charlie 110C may be used for a business level of color printing for first paper 302A. The disclosed embodiments, preferably at color management system 101, will not allow calibration alpha to be used for a business level of color printing for print job 103.

A fourth calibration request includes second paper 302B for paper type 112 and first color quality attribute value 401A for color quality attribute 116. The disclosed embodiments generate calibration golf 110G, which is stored with stored first color quality attribute value 402A, which corresponds to first color quality attribute value 401A. Thus, calibrations may have the same color quality attribute values to indicate the level of quality for printing that associated paper. Further, if print job 103 designates first color quality attribute value 401A, then color management system 101 will not allow calibrations having different values to be used in printing second paper 302B. Calibration golf 110G is used to create ICC profile 304G.

When creating the ICC profiles, the operator may be given only the option to select a calibration. The selected calibration is used to generate the respective ICC profile for the paper. Further, the created ICC profile is applicable to printing operations for the indicated color quality level, as defined by the color quality attribute value stored with the calibration. The operator may not create ICC profiles using the wrong calibration. The ICC profile is associated with the calibration, which in turn is associated with all settings used to create the calibration. For example, ICC profile bravo 304B is associated with a standard level of quality for color printing operations using first paper 302A due to stored second color quality level attribute value 402B.

The disclosed embodiments are applicable when a new paper is added to paper catalog 302. The operator may define multiple levels of quality for color printing operations using the new paper. Color management system 101 may create calibrations for each level of quality defined by the operator using color quality attribute 116. Calibrations 110P are created and stored at DFE 106 with the associated level of quality, as defined by the stored color quality attribute value. The ICC profiles are generated accordingly, and also associated the color quality level. The operator does not need to track the calibrations and attempt to match the calibrations and ICC profiles to the level of quality for the new paper.

The disclosed embodiments also allow the color quality level to be added to print ticket 118 for print job 103 using selected color quality attribute value 404. If the operator selects an entry in paper catalog 302, then color management system 102 will find calibrations associated with the selected paper and display values associated with the paper.

For example, print job 103 includes print ticket 118. Color management system 101, in helping prepare print ticket 118, notes that first paper 302A is selected. Thus, the color quality attribute values associated with the calibrations for first paper 302A are provided. Using FIG. 4, the displayed color quality levels provided for first paper 302A may be premium for stored first color quality attribute value 402A, standard for stored second color quality attribute value 402B, and business for stored third color quality attribute value 402C. The operator does not need to select the specific calibrations, and, in turn, the specific ICC profile. Instead, the color quality level is selected, which triggers the application of the correct calibration and ICC profile. For example, if print ticket 118 includes selected color quality attribute value 404 of business, then color management system 101 instructs printing device 104 to retrieve calibration charlie 100C and ICC profile 304C. This is done automatically without any need for input by the operator.

Color management system 101 also may use the color quality level defined by print ticket 118 to conflict check and to resolve potential problems before submitting print job 103 to printing device 104. If the operator selects a color quality level not available for the selected paper as no calibrations for that level are not present, then color management system 101 may warn the operator. For example, referring to FIG. 4, second paper 302B does not have color printing resources available for an economy color quality level. Thus, if print ticket 118 includes a value for the economy color quality level as selected color quality attribute level 404, then color management system 101 will warn the operator and not generate the print ticket.

As noted above, if a paper does not have a calibration for the selected quality level, then color management system 101 may determine whether the paper belongs to a paper group and use the calibrations associated with the paper group. For example, first paper 302A and second paper 302B may belong to the same paper group, which means the papers have features in common. If print ticket 118 includes a request to print out print job 103 on second paper 302B and a selected color quality attribute value 404 of standard, then color management system 101 may use calibration bravo 110B and ICC profile 304B as second paper 302B does not have a calibration stored that has a stored second color quality attribute value 402B, which corresponds to a quality level of standard. Thus, the disclosed embodiments may use the color quality attribute to manage color printing operations without the need for additional calibrations or to delay print jobs that do not identify an existing calibration.

In some situations, print ticket 118 may specify a paper in paper catalog 302 that does not have an associated calibration for the desired color quality level and does not belong to a paper group. Color management system 101 may determine a media type for the paper and use calibrations associated with the media type. For example, second paper 302B may be a specified media type, such as A4 paper having a weight of 60 lbs. First paper 302A also may be A4 paper having a weight within a range of 60 lbs. As like above with the paper group, second paper 302B may be associated with calibrations for first paper 302A if none exist for the selected color quality level for print ticket 118.

Print ticket 118 also may specify paper attributes in job settings 120. Color management system 101 may determine whether the paper attributes match tray attributes for one or more document feeder trays 230, entries for paper catalog 302, or both. The paper attributes also may correspond to color quality levels. The disclosed embodiments may ensure that selected color quality attribute value 404 matches the tray attributes and paper catalog entries for the color quality level for the value.

For example, if the attributes within job settings 120 only match to paper catalog entries, then color management system 101 will find all matching paper catalog entries of paper catalog 302 that match selected color quality attribute value 404. Color management system 101 identifies all potential paper catalog entries that can provide the desired level of color quality. If the job settings call for a standard level of color quality through the attributes defined in job settings 120, then color management system 101 would return an entry for first paper 302A only. If the attributes defined in job settings 120 result in a premium level of color quality, then color management system 101 would return entries for first paper 302A and second paper 302B. The operator may select one of these papers from paper catalog 302.

If job settings 120 define attributes for printing device 104 that limit the type of color quality levels to be used at the printing device, then color management system 101 will only provide the papers that meet the attributes for selection in printing operations. For example, if the tray attributes do not support a premium level of color quality, then papers within paper catalog that have a stored first color quality attribute value 402A are not made available for printing operations. If the operator only specifies a source tray then color management system 101 determines the media type for the source tray and displays those that meet the desired level of color quality using the stored color quality attribute values for the respective calibrations. Thus, color management system 101 may manage color printing without involvement by the operator. It may do so automatically.

Figure 5:
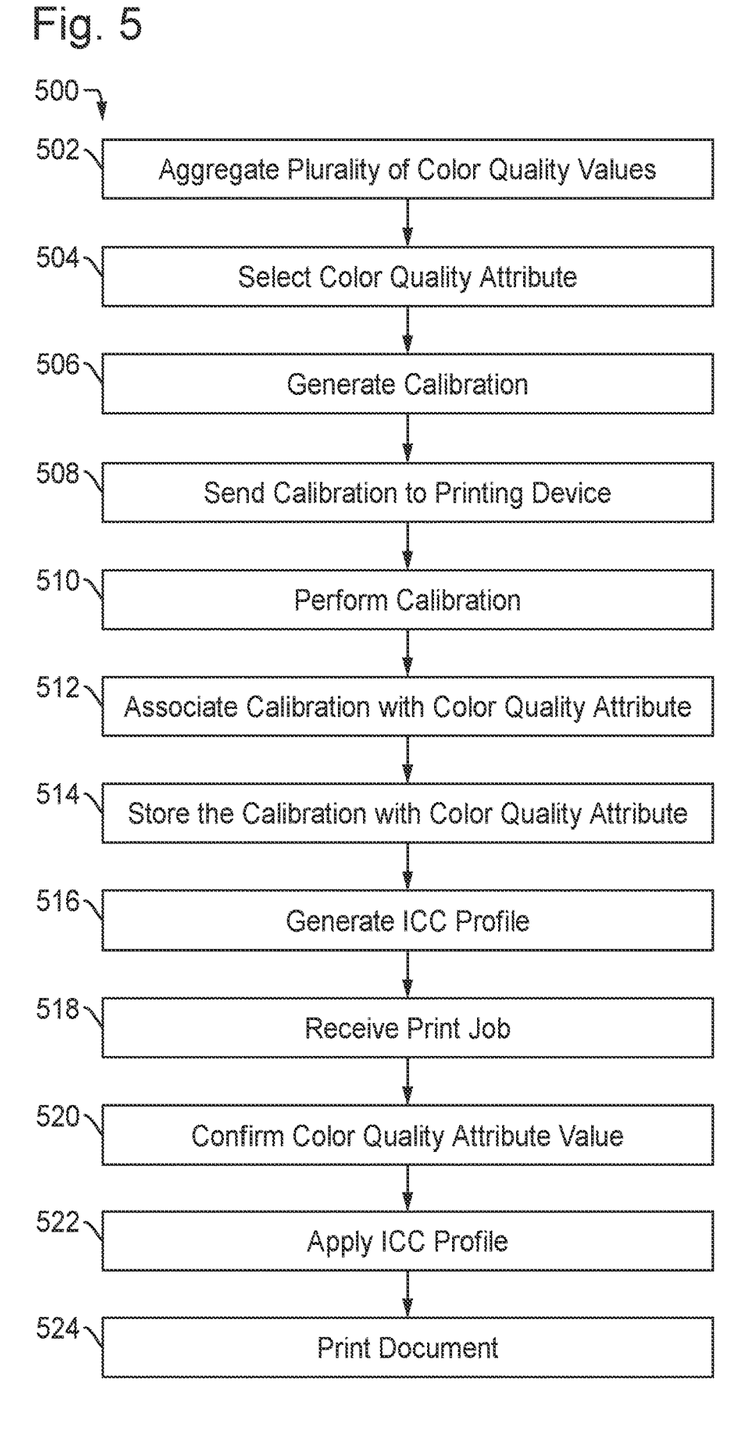
FIG. 5 illustrates a flowchart for managing color printing resources using a color quality attribute according to the disclosed embodiments.

FIG. 5 depicts a flowchart 500 for managing color printing resources using color quality attribute 116 according to the disclosed embodiments. Flowchart 500 may refer to FIGS. 1A-4 for illustrative purposes. Flowchart 500, however, is not limited by the embodiments disclosed by FIGS. 1A-4.

Step 502 executes by aggregating a plurality of color quality values 108 from one or more print device 104. Plurality of color quality values indicate the levels of quality that may be printed on printing device, such as premium, standard, business, economy, and the like. Color management system 101 may receive this information so it knows what levels of quality to present to the operator. Further, the levels of quality correspond to a color quality attribute value that is used in printing operations.

Step 504 executes by selecting a color quality attribute 116 for a paper type 112 for use within printing device 104. Step 506 executes by generating calibration 110 for paper type 112. Calibration 110 also includes print, or calibration, settings 114 and color quality attribute 116. Color quality attribute 116 may have a value that species the level of quality applicable to calibration 110 for paper type 112. Step 508 executes by sending calibration 110 to printing device 104. Multiple calibrations may be sent to different printing devices, with each calibration having a color quality attribute 116.

Step 510 executes by performing calibration 110 at printing device 104. Printing device 104 performs the calibration operations to capture data used to generate the resources used for color printing paper type 112. One or more TRCs may be generated using the captured data. Further, calibration settings such as EPTs, aims, and print conditions may be determined. The result is stored as a calibration at printing device 104. Step 512 executes by associating the performed calibration results with color quality attribute 116 that was received with the request to perform calibration 110 from color management system 101. Step 514 executes by storing the resulting calibration with a color quality attribute value at printing device.

For example, printing device 104 performs calibration operations based on calibration 110 for paper type 112. As a result, first paper 302A is placed in paper catalog 302. Calibration alpha 110A is generated based on the captured data from the calibration operations. Calibration alpha 110A is stored at DFE 106 with stored first color quality attribute value 402A, which corresponds to the level of quality specified by color quality attribute 116.

Step 516 executes by generating an ICC profile based on the stored calibration. For example, ICC profile alpha 304A is created based on calibration alpha 110A. ICC profile alpha 304A also is associated with stored first color quality attribute value 402A. In other words, ICC profile alpha is associated with a level of quality for paper 302A as specified by color quality attribute 116.

Step 518 executes by receiving print job 103 at printing device 104. Print job 103 also may be received at color management system 101. Print job 103 includes print ticket 118 having job settings 120. Job settings 120 may specify a paper within a paper catalog 302 to print along with a selected color quality attribute value 404. For example, print ticket 118 may specify first paper 302A as the print media for print job 103. As such, it then should identify stored first color quality attribute value 402A as selected color quality attribute value 404 in order to use calibration alpha 110A and ICC profile alpha 304A.

Step 520 executes by confirming selected color quality attribute value 404 matches one of the stored color quality attributes for first paper 302A specified as the print media by print ticket 118. Color management system 101 may confirm that the appropriate calibration and ICC profile is available for the desired paper in paper catalog 302. Using the above example, selected color quality attribute value 404 corresponds to the premium level of quality for printing using first paper 302A. The disclosed embodiments determine that first paper 302A includes a calibration and ICC profile for color printing at a premium level of quality on printing device 104.

Step 522 executes by applying the ICC profile for color printing the corresponds to the calibration identified by selected color quality attribute value 404. Using the above example, selected color quality attribute value 404 is premium for first paper 302A so that calibration alpha 110A is identified based on stored first color quality attribute value 402A. In turn, ICC profile alpha 304A is applied for print job 103 using first paper 302A. Step 524 executes by printing document 105 using ICC profile alpha 304A for color printing operations, at a premium level of quality.

Flowchart 500 may be performed for multiple paper types so that different calibrations and ICC profiles are associated with the different papers in paper catalog 302. Different calibrations may apply to single paper entry in paper catalog. Color management system 101 or printing device 104 may determine which calibration to apply for the specified paper based on the selected color quality attribute value with the print ticket for the print job. Using the selected color quality attribute value, the appropriate calibration and ICC profile are identified and applied in color printing operations to provide the specified level of quality corresponding to the selected color quality attribute value.

Figure 6:
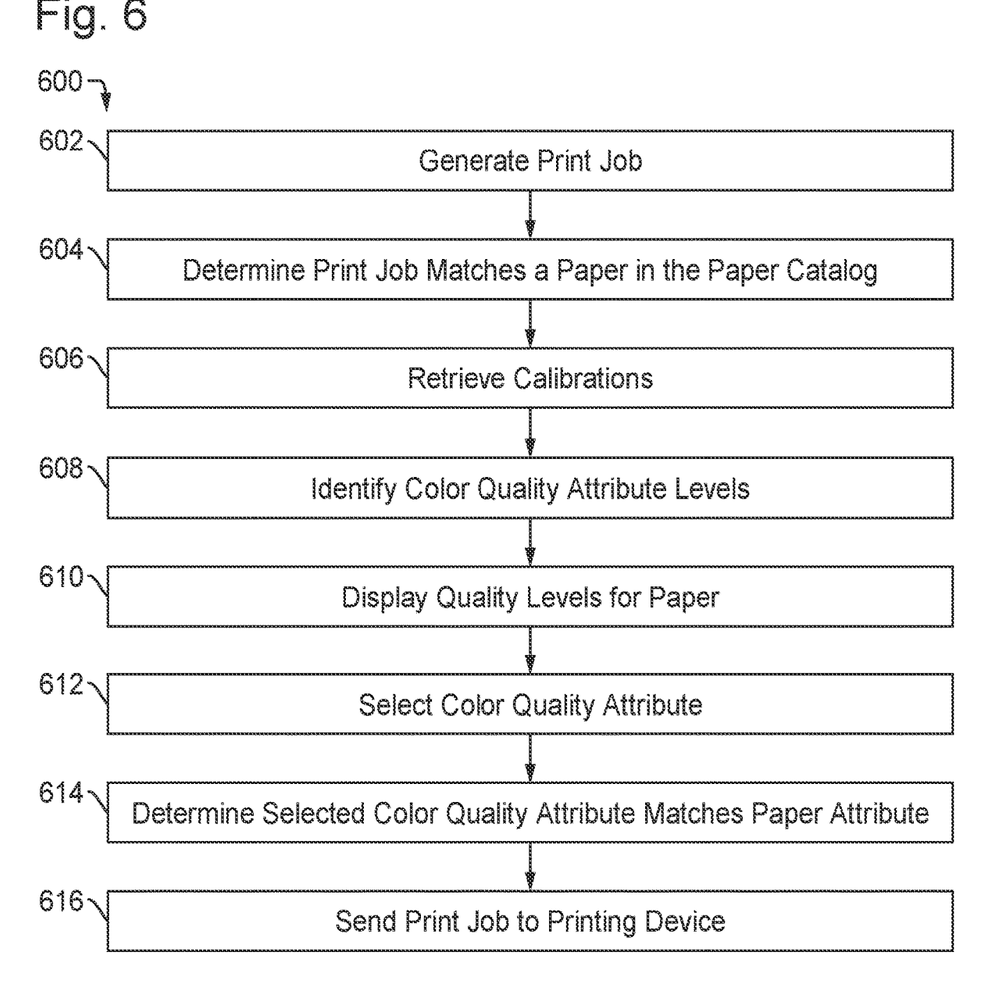
FIG. 6 illustrates a flowchart for color printing a document at the printing device using selected color quality attribute value according to the disclosed embodiments.

FIG. 6 depicts a flowchart 600 for color printing a document at printing device 104 using selected color quality attribute value 404 according to the disclosed embodiments. Flowchart 600 may refer to FIGS. 1A-5 for illustrative purposes.

Step 602 executes by generating print job 103 within printing system 100. Print job 103 may be generated at client device 102. Before submitting print job 103 to printing device 104, color management system 101 may interact with client device 102 to manage color printing operations. Print job 103 includes print ticket 118 having job settings 120. Job settings 120 may include one or more paper attributes, such a paper type or tray settings. For example, job settings 120 may specify that print job 103 be printed on first paper 302A in paper catalog 302. Thus, step 604 executes by determining the selected paper for print job 103 matches a paper in paper catalog 302.

Step 606 executes by retrieving calibrations for the paper. These are the stored calibrations associated with the paper. A paper in paper catalog 302 may be associated with one or more calibrations, wherein the calibrations provide different levels of color printing quality. Step 608 executes by identifying color quality attribute levels for the retrieved calibrations. For example, referring to FIG. 4, first paper 302A may be associated with three calibrations, each having a different color quality level as specified by the respective color quality attribute value stored with the respective calibration.

Step 610 executes by displaying the identified quality levels for the paper at client device 102. These levels also may be displayed at printing device 104. The operator may review the provided levels of quality available for color printing operations using the paper. Using the above example, the levels of quality defined by stored first color quality attribute value 402A for calibration alpha 110A, stored second color quality attribute value 402B for calibration bravo 110B, and stored third color quality attribute 402C for calibration charlie 110C are displayed for printing print job 103 using first paper 302A.

Step 612 executes by selecting a color quality attribute for print job 103 based on the desired level of color printing quality. Selected color quality attribute value 404 may refer to the color quality attribute within print ticket 118 to determine the quality level applicable to first paper 302A. Color management system 101 also may confirm that the selected color quality level is available and matches the calibration for the paper.

Step 614 executes by determining selected color quality attribute value 404 matches the paper attribute set in job settings 120. In some embodiments, the paper attribute may be the paper in paper catalog 302. The disclosed embodiments match the selected color printing quality level with the calibration selected to print the paper. If the selected color quality attribute does not match the calibration, then a warning may be displayed to the operator. In other embodiments, the paper attribute may define which tray to use for print job 103. The disclosed embodiments may perform the same process regarding the paper in the tray and its associated calibrations. Further, a tray attribute may be defined that indicates the level of quality for printing using the media in the corresponding tray. If color quality attribute for selected color quality attribute value 404 does not match the level of color printing quality for the tray attribute, then the disclosed embodiments may warn the operator.

Step 616 executes by sending print job 103 to printing device 104. Job settings 120 may include information to apply the ICC profile corresponding to the calibration and stored color quality attribute value indicated by the selected color quality attribute in print ticket 118. In this manner, the color printing resources are managed according to the disclosed embodiments.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for managing color printing resources for printing operations, the method comprising:
    selecting a color quality attribute for a paper for use in the printing operations at a printing device;
    performing a calibration for the paper, wherein settings for the calibration correspond to the color quality attribute;
    storing the calibration for the paper with the color quality attribute;
    generating an ICC profile based on the calibration, wherein the ICC profile is associated with the settings for the calibration and the color quality attribute;
    receiving a print job using the paper, wherein the print job specifies the color quality attribute using a print ticket for the print job; and
    applying the ICC profile to color printing the print job using the paper.

2. The method of claim 1, further comprising creating the color quality attribute.

3. The method of claim 1, further comprising querying a plurality of printing devices within a printing system, wherein the plurality of printing devices includes the printing device.

4. The method of claim 3, further comprising aggregating a plurality of color quality attributes from the plurality of printing devices, wherein the color quality attribute selected for the paper is in the plurality of color quality attributes.

5. The method of claim 1, wherein selecting the color quality attribute includes selecting from a plurality of color quality attributes.

6. The method of claim 5, wherein each of the plurality of color quality attributes corresponds to specific settings to perform the calibration.

7. A method for color printing a document at a printing device, the method comprising:
    generating a print job using a media to be printed at the printing device, wherein the print job specifies a paper attribute;
    determining whether the paper attribute matches a paper catalog entry;
    displaying at least one color quality attribute for the paper catalog entry;
    selecting a color quality attribute from the at least one color quality attribute by matching the color quality attribute with at least one print ticket setting for the print job; and
    printing the print job using a paper associated with the color quality attribute at the printing device.

8. The method of claim 7, further comprising determining whether the paper attribute matches a tray paper attribute.

9. The method of claim 8, further comprising confirming the paper associated with the color quality attribute is compatible with the tray paper attribute.

10. The method of claim 7, further comprising sending a warning if the paper associated with the color quality attribute is not available at the printing device.

11. The method of claim 7, further comprising sending a warning if the paper attribute does not match the paper catalog entry.

12. A method for managing color printing resources for printing operations, the method comprising:
- querying a plurality of printing devices within a printing system, wherein the plurality of printing devices includes a printing device;
- aggregating a plurality of color quality attributes from the plurality of printing devices;
- selecting a color quality attribute from the plurality of color quality attributes for a paper for use in the printing operations at the printing device;
- performing a calibration for the paper, wherein settings for the calibration correspond to the color quality attribute;
- storing the calibration for the paper with the color quality attribute;
- generating an ICC profile based on the calibration, wherein the ICC profile is associated with the settings for the calibration and the color quality attribute;
- receiving a print job using the paper, wherein the print job specifies the color quality attribute; and
- applying the ICC profile to color printing the print job using the paper.

13. The method of claim 12, further comprising creating the color quality attribute.

14. The method of claim 12, further comprising specifying the color quality attribute with a print ticket for the print job.

* * * * *